United States Patent [19]

Nagler

[11] Patent Number: 4,747,675

[45] Date of Patent: May 31, 1988

[54] ULTRA WIDE-ANGLE EYEPIECE

[76] Inventor: Albert Nagler, 15 Green Hill La., Spring Valley, N.Y. 10977

[21] Appl. No.: 56,060

[22] Filed: Jun. 1, 1987

[51] Int. Cl.$^4$ .......................... G02B 25/04; G02B 9/60; G02B 9/62

[52] U.S. Cl. ..................................... 350/410; 350/464; 350/465

[58] Field of Search ........................ 350/410, 464, 465

[56] References Cited

U.S. PATENT DOCUMENTS

| | | | |
|---|---|---|---|
| 2,423,676 | 7/1947 | Altman | 350/410 |
| 2,549,158 | 4/1951 | Bertele | 350/410 |
| 3,390,935 | 7/1968 | Scidmore | 350/410 |
| 3,768,890 | 10/1973 | Osawa et al. | 350/410 |
| 4,286,844 | 9/1981 | Nagler | 350/410 |
| 4,525,035 | 6/1985 | Nagler | 350/410 |

Primary Examiner—John K. Corbin
Assistant Examiner—Scott J. Sugarman
Attorney, Agent, or Firm—William P. Keegan

[57] ABSTRACT

Ultra wide-angle eyepieces with relatively long focal lengths and minimal spherical aberration of the exit pupil and field curvature. The eyepieces use six elements in a positive power lens group and two elements in a negative power lens group.

4 Claims, 2 Drawing Sheets

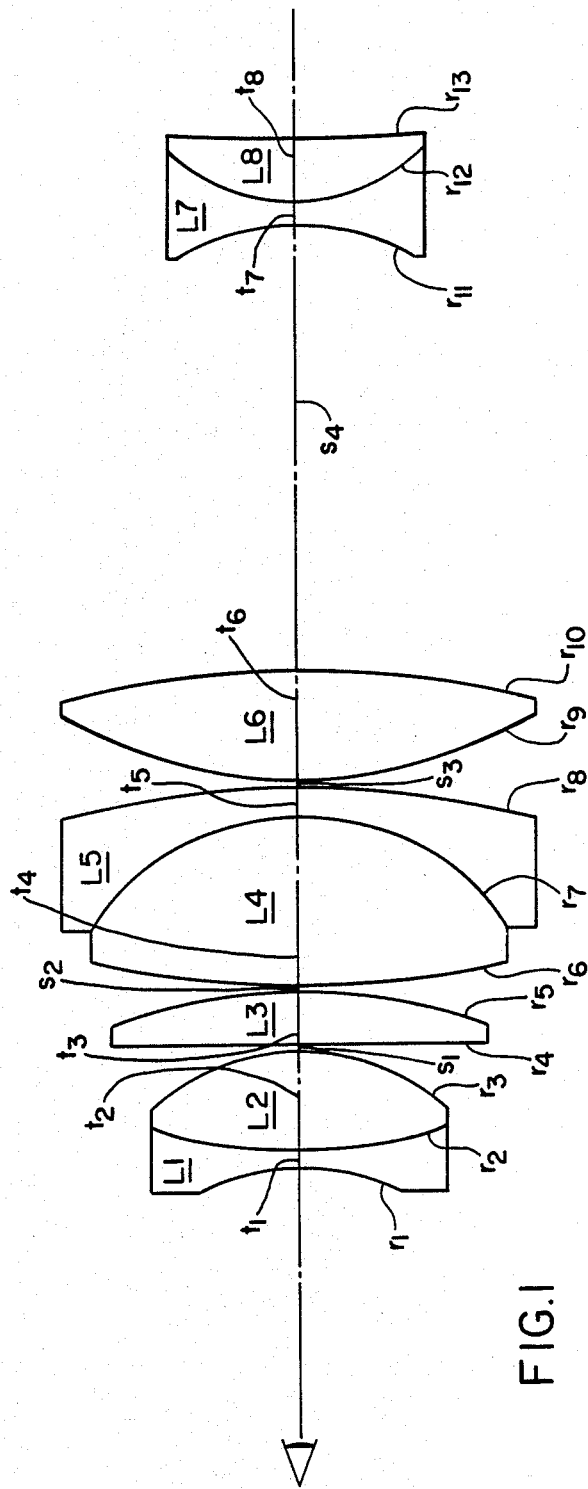
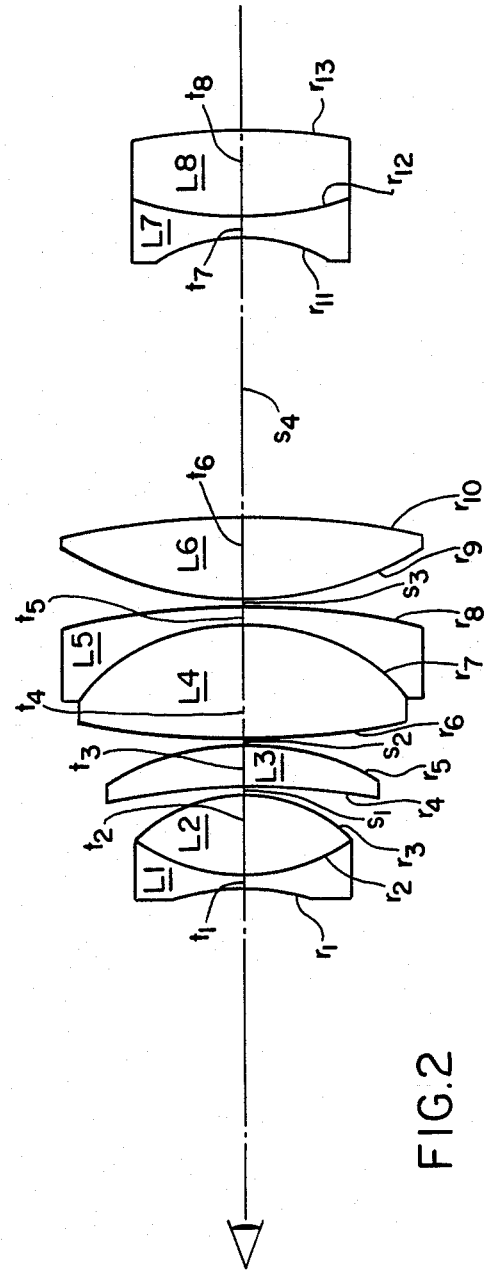
FIG.1
FIG.2

ULTRA WIDE-ANGLE EYEPIECE

FIELD OF THE INVENTION

The invention relates to eyepieces suited especially for use with astronomical telescopes, and more particularly to such eyepieces having a wide field of view.

BACKGROUND OF THE INVENTION

Ultra wide-angle eyepieces employing positive power lens elements on one side of the internal focal plane and a negative power lens on the other side of the focal plane, i.e., between the positive lens and the telescope objective, have been disclosed heretofore as, for example, in my earlier U.S. Pat. No. 4,286,844. The eyepieces there disclosed were shown to be effective in achieving highly corrected flat fields of view. The improved field curvature is obtained by compensating the field curvature of the positive lens group by that of the negative lens. However, the use of the negative lens with strongly divergent rays requires a large aperture positive lens with attendant comparatively high manufacturing costs and weight. Consequently, the focal lengths of such wide angle eyepieces were kept relatively short, e.g., 13 mm., to minimize their weight.

Moreover, ultra wide-angle eyepieces, i.e., those having an apparent field of view exceeding 50 degrees, give rise to spherical aberration of the exit pupil. Rays with large exit angles will usually intersect the optical axis nearer to the last eyepiece lens element than those rays with small or moderate exit angle. This results in the so-called "kidney bean" effect when the circle of least confusion of the exit pupil of the eyepiece exceeds in size the pupil of the observer's eye. Thus, eyepieces as disclosed in my aforementioned patent were, for all practical purposes, limited to 13 mm. focal lengths for night observations and to 9 mm. focal lengths for daytime use.

GENERAL DESCRIPTION OF THE INVENTION

The object of the invention is to provide improved ultra wide-angle eyepieces.

Another object of the invention is to provide relatively smaller, less costly ultra wide-angle eyepieces with minimal field curvature.

Still another object of the invention is to provide ultra wide-angle eyepieces that are suitable for manufacture in longer focal lengths.

Yet another object of the invention is to provide longer focal length ultra wide-angle eyepieces with minimal spherical aberration of the exit pupil and field curvature.

In carrying out the invention, there is provided an ultra wide-angle eyepiece having six elements in the positive power lens group and two elements in the negative power lens group. The positive group elements may be 2-1-2-1, or 2-1-1-2, in form, but the surface closest to the internal focal plane must be convex or plano to minimize spherical aberration of the exit pupil, it cannot be concave.

Features and advantages of the invention may be gained from the foregoing and from the description of preferred embodiments thereof which follow.

DESCRIPTION OF THE DRAWING

FIG. 1 is a schematic longitudinal sectional view showing one embodiment of the invention;

FIG. 2 is a similar view of another embodiment of the invention;

DETAILED DESCRIPTION OF THE INVENTION

Figure 3:
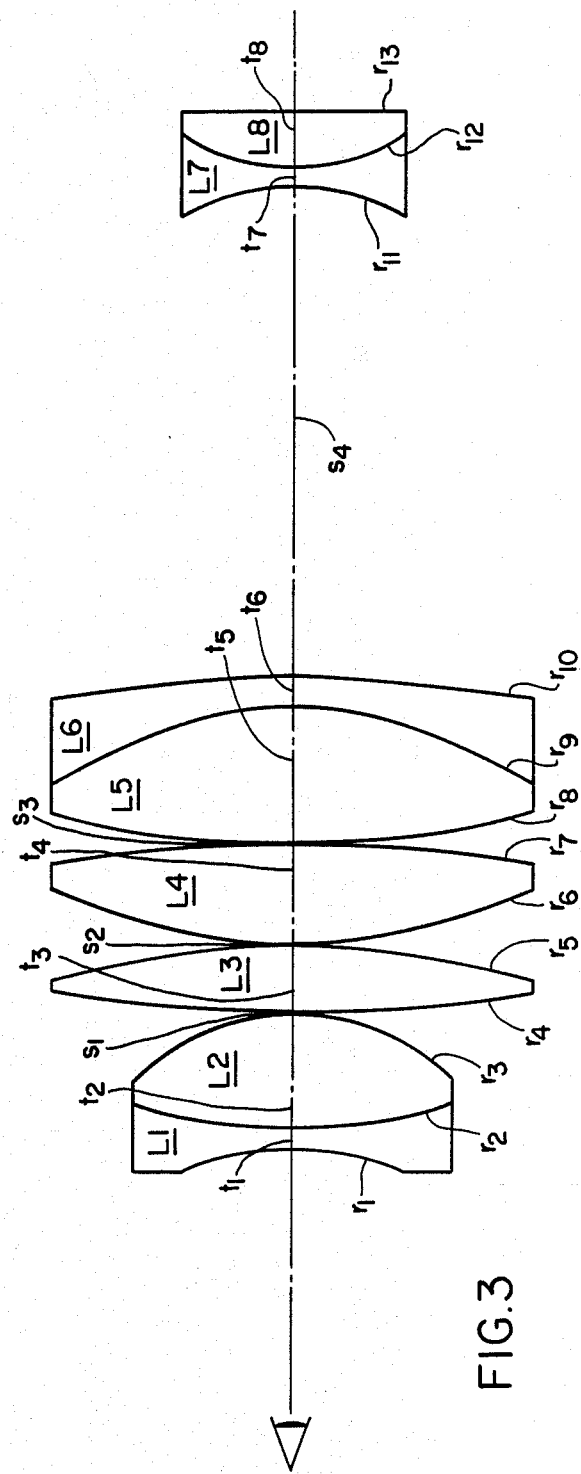
FIG. 3 is a similar view of still another embodiment of the invention.
Figure 4:
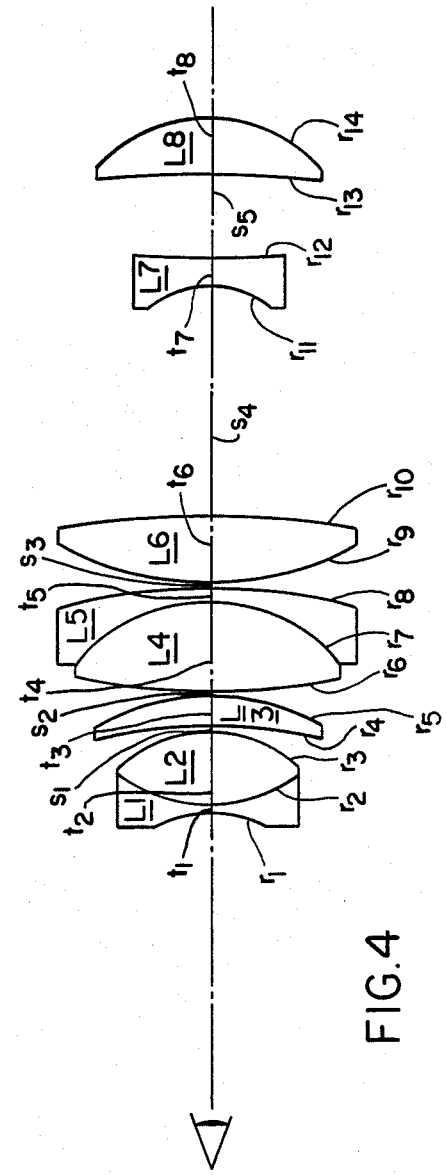
FIG. 4 is a similar view of another embodiment of the invention.

The eyepieces shown in FIGS. 1 to 4 with the lens specifications set forth in Tables I to IV, respectively, show excellent aberrational correction over fields in the range of 80 to 90 degrees diameter. The smaller eyepieces, i.e., those shown in FIGS. 2 and 4 and specified in Tables II and IV permit scaling up to longer focal lengths while retaining reasonable size and weight, and eye relief.

A measure of the improvement in spherical aberration of the exit pupil is the axial focal differences for telecentric rays entering the eyepiece corresponding to 30 to 40 degree semi-field angles. In a 10 mm. focal length eyepiece according to the disclosure in my aforementioned patent the focal difference is 3.14 mm. In a 10 mm. focal length eyepiece according to the present invention, the focal differences are: 1.93 mm. for the FIG. 1, Table I eyepiece; 0.94 mm. for the FIG. 2, Table II eyepiece; 1.9 mm. for the FIG. 3, Table III eyepiece; and 0.47 mm. for the FIG. 4, Table IV eyepiece.

Each eyepiece has an internal focal plane located between lens 6 and lens 7. A stop will generally be provided at the focal plane.

The lens data set forth in the following tables are, in all cases, for eyepieces having a 10 mm. focal length and an 80 to 90 degree field of view. All are well corrected for telecentric input beams as fast as f/4. Lens radii, lens thicknesses, apertures, and lens separations are given in millimeters. N is the refractive index of the glass, and V is the Abbe number for the glass.

The eyepiece illustrated in FIG. 1 and specified in Table I has a Petzval radius of −147.48, while that illustrated in FIG. 2 and specified in Table II has a Petzval radius of −66.24. The eyepiece illustrated in FIG. 3 and specified in Table III has a Petzval radius of −147.48, while the eyepiece illustrated in FIG. 4 and specified in Table IV has a Petzval radius of −144.09.

TABLE I

| Lens | Radius | Thickness | Aperture | Glass | N | V |
|---|---|---|---|---|---|---|
| L1 | r1 = −18.56 | t1 = 1.65 | 8.24 | SF5 | 1.6727 | 32.2 |
| L2 | r2 = +44.30 | t2 = 7.83 | 12.36 | SK16 | 1.6204 | 60.3 |
|    | r3 = −18.56 | s1 = 0.41 |  |  |  |  |
| L3 | r4 = plano | t3 = 4.53 | 15.66 | SK16 | 1.6204 | 60.3 |
|    | r5 = −44.30 | s2 = 0.41 |  |  |  |  |
| L4 | r6 = +82.40 | t4 = 14.01 | 17.30 | SK16 | 1.6204 | 60.3 |
| L5 | r7 = −20.59 | t5 = 2.47 | 19.77 | SF1 | 1.7174 | 29.5 |
|    | r8 = −82.40 | s3 = 0.41 |  |  |  |  |
| L6 | r9 = +40.14 | t6 = 9.06 | 19.77 | SK16 | 1.6204 | 60.3 |
|    | r10 = −82.40 | s4 = 36.26 |  |  |  |  |
|    | r11 = −20.59 |  |  |  |  |  |

TABLE I-continued

| Lens | Radius | Thickness | Aperture | Glass | N | V |
|---|---|---|---|---|---|---|
| L7 | | t7 = 2.06 | 9.89 | LAK8 | 1.7130 | 53.8 |
| | r12 = +15.57 | | | | | |
| L8 | | t8 = 4.94 | 10.71 | SF1 | 1.7174 | 29.5 |
| | r13 = +168.59 | | | | | |

TABLE II

| Lens | Radius | Thickness | Aperture | Glass | N | V |
|---|---|---|---|---|---|---|
| | r1 = −12.94 | | | | | |
| L1 | | t1 = 0.94 | 5.46 | SF5 | 1.6727 | 32.2 |
| | r2 = +17.67 | | | | | |
| L2 | | t2 = 6.38 | 9.10 | SK16 | 1.6204 | 60.3 |
| | r3 = −12.94 | | | | | |
| | | s1 = 0.44 | | | | |
| | r4 = −58.39 | | | | | |
| L3 | | t3 = 3.63 | 11.38 | SK16 | 1.6204 | 60.3 |
| | r5 = −22.15 | | | | | |
| | | s2 = 0.44 | | | | |
| | r6 = +73.57 | | | | | |
| L4 | | t4 = 9.57 | 13.65 | SK16 | 1.6204 | 60.3 |
| | r7 = −17.67 | | | | | |
| L5 | | t5 = 1.38 | 13.65 | SF1 | 1.7174 | 29.5 |
| | r8 = −58.39 | | | | | |
| | | s3 = 0.44 | | | | |
| | r9 = +27.95 | | | | | |
| L6 | | t6 = 6.82 | 15.02 | SK16 | 1.6204 | 60.3 |
| | r10 = −73.57 | | | | | |
| | | s4 = 22.84 | | | | |
| | r11 = −14.09 | | | | | |
| L7 | | t7 = 1.88 | 6.83 | LAF21 | 1.7883 | 47.4 |
| | r12 = +33.63 | | | | | |
| L8 | | t8 = 6.88 | 9.10 | SF4 | 1.7552 | 27.6 |
| | r13 = −46.46 | | | | | |

TABLE III

| Lens | Radius | Thickness | Aperture | Glass | N | V |
|---|---|---|---|---|---|---|
| | r1 = −24.25 | | | | | |
| L1 | | t1 = 1.89 | 9.33 | SF1 | 1.7174 | 29.5 |
| | r2 = +44.45 | | | | | |
| L2 | | t2 = 9.25 | 13.33 | SK16 | 1.6204 | 60.3 |
| | r3 = −19.99 | | | | | |
| | | s1 = 0.16 | | | | |
| | r4 = +130.93 | | | | | |
| L3 | | t3 = 5.43 | 20.00 | SK16 | 1.6204 | 60.3 |
| | r5 = −69.51 | | | | | |
| | | s2 = 0.16 | | | | |
| | r6 = +48.50 | | | | | |
| L4 | | t4 = 8.15 | 20.00 | SK16 | 1.6204 | 60.3 |
| | r7 = −146.71 | | | | | |
| | | s3 = 0.16 | | | | |
| | r8 = +88.33 | | | | | |
| L5 | | t5 = 11.28 | 20.00 | SK16 | 1.6204 | 60.3 |
| | r9 = −32.88 | | | | | |
| L6 | | t6 = 2.35 | 20.00 | SF1 | 1.7174 | 29.5 |
| | r10 = −103.48 | | | | | |
| | | s4 = 39.83 | | | | |
| | r11 = −20.64 | | | | | |
| L7 | | t7 = 1.59 | 9.33 | LAK8 | 1.7130 | 53.8 |
| | r12 = +17.52 | | | | | |
| L8 | | t8 = 4.25 | 9.33 | SF1 | 1.7174 | 29.5 |
| | r13 = +1144.93 | | | | | |

TABLE IV

| Lens | Radius | Thickness | Aperture | Glass | N | V |
|---|---|---|---|---|---|---|
| | r1 = −10.23 | | | | | |
| L1 | | t1 = 0.79 | 4.75 | SF5 | 1.6727 | 32.2 |
| | r2 = +14.02 | | | | | |
| L2 | | t2 = 5.94 | 7.53 | SK16 | 1.6204 | 60.3 |
| | r3 = −10.23 | | | | | |
| | | s1 = 0.28 | | | | |
| | r4 = −46.05 | | | | | |
| L3 | | t3 = 2.77 | 9.51 | SK16 | 1.6204 | 60.3 |
| | r5 = −17.62 | | | | | |
| | | s2 = 0.28 | | | | |
| | r6 = +59.09 | | | | | |
| L4 | | t4 = 7.13 | 10.89 | SK16 | 1.6204 | 60.3 |
| | r7 = −14.02 | | | | | |
| L5 | | t5 = 1.19 | 10.89 | SF1 | 1.7174 | 29.5 |
| | r8 = −46.05 | | | | | |
| | | s3 = 0.28 | | | | |
| | r9 = +22.31 | | | | | |
| L6 | | t6 = 5.94 | 12.28 | SK16 | 1.6204 | 60.3 |
| | r10 = −59.09 | | | | | |
| | | s4 = 19.03 | | | | |
| | r11 = −7.61 | | | | | |
| L7 | | t7 = 1.98 | 5.15 | LAF2 | 1.7440 | 44.9 |
| | r12 = +56.61 | | | | | |
| | | s5 = 6.93 | | | | |
| | r13 = −82.46 | | | | | |
| L8 | | t8 = 4.36 | 9.31 | FK5 | 1.4875 | 70.4 |
| | r14 = −12.63 | | | | | |

Having thus described the invention, it is to be understood that the drawing and the specification are to be interpreted as illustrative rather than in a limiting sense.

What is claimed is:

1. An ultra wide-angle eyepiece having six lens elements in the positive power group arranged in a 2-1-2-1 format and two lens elements in the negative power group with the internal focal plane of the eyepiece lying between the two groups in which the lens surface of the positive group closest to the internal focal plane is convex or plano, said lens elements for a 10 mm. focal length eyepiece having parameters substantially as set forth in the following table wherein lens curvatures, lens thicknesses, and lens separations are given in millimeters, and N is the refractive index and V is the Abbe number of the glass used for a lens element:

| Lens | Radius | Thickness | Aperture | Glass | N | V |
|---|---|---|---|---|---|---|
| | r1=−18.56 | | | | | |
| L1 | | t1=1.65 | 8.24 | SF5 | 1.6727 | 32.2 |
| | r2=+44.30 | | | | | |
| L2 | | t2=7.83 | 12.36 | SK16 | 1.6204 | 60.3 |
| | r3=−18.56 | | | | | |
| | | s1=0.41 | | | | |
| | r4=plano | | | | | |
| L3 | | t3=4.53 | 15.66 | SK16 | 1.6204 | 60.3 |
| | r5=−44.30 | | | | | |
| | | s2=0.41 | | | | |
| | r6=+82.40 | | | | | |
| L4 | | t4=14.01 | 17.30 | SK16 | 1.6204 | 60.3 |
| | r7=−20.59 | | | | | |
| L5 | | t5=2.47 | 19.77 | SF1 | 1.7174 | 29.5 |
| | r8=−82.40 | | | | | |
| | | s3=0.41 | | | | |
| | r9=+40.14 | | | | | |
| L6 | | t6=9.06 | 19.77 | SK16 | 1.6204 | 60.3 |
| | r10=−82.40 | | | | | |
| | | s4=36.26 | | | | |
| | r11=−20.59 | | | | | |
| L7 | | t7=2.06 | 9.89 | LAK8 | 1.7130 | 53.8 |
| | r12=+15.57 | | | | | |
| L8 | | t8=4.94 | 10.71 | SF1 | 1.7174 | 29.5 |
| | r13=+168.59 | | | | | |

2. An ultra wide-angle eyepiece having six lens elements in the positive power group arranged in a 2-1-2-1 format and two lens elements in the negative power group with the internal focal plane of the eyepiece lying between the two groups in which the lens surface of the positive group closest to the internal focal plane is convex or plano, said lens elements for a 10 mm. focal length eyepiece having parameters substantially as set forth in the following table wherein lens curvatures, lens thicknesses, and lens separations are given in millimeters, and N is the refractive index and V is the Abbe number of the glass used for a lens element:

| Lens | Radius | Thickness | Aperture | Glass | N | V |
|---|---|---|---|---|---|---|
| L1 | r1 = −12.94 | t1 = 0.94 | 5.46 | SF5 | 1.6727 | 32.2 |
| L2 | r2 = +17.67 | t2 = 6.38 | 9.10 | SK16 | 1.6204 | 60.3 |
|  | r3 = −12.94 | s1 = 0.44 |  |  |  |  |
| L3 | r4 = −58.39 | t3 = 3.63 | 11.38 | SK16 | 1.6204 | 60.3 |
|  | r5 = −22.15 | s2 = 0.44 |  |  |  |  |
| L4 | r6 = +73.57 | t4 = 9.57 | 13.65 | SK16 | 1.6204 | 60.3 |
|  | r7 = −17.67 |  |  |  |  |  |
| L5 | r8 = −58.39 | t5 = 1.38 | 13.65 | SF1 | 1.7174 | 29.5 |
|  | r9 = +27.95 | s3 = 0.44 |  |  |  |  |
| L6 | r10 = −73.57 | t6 = 6.82 | 15.02 | SK16 | 1.6204 | 60.3 |
|  | r11 = −14.09 | s4 = 22.84 |  |  |  |  |
| L7 | r12 = +33.63 | t7 = 1.88 | 6.83 | LAF21 | 1.7883 | 47.4 |
| L8 | r13 = −46.46 | t8 = 6.88 | 9.10 | SF4 | 1.7552 | 27.6 |

3. An ultra wide-angle eyepiece having six lens elements in the positive power group arranged in a 2-1-1-2 format and two lens elements in the negative power group with the internal focal plane of the eyepiece lying between the two groups in which the lens surface of the positive group closest to the internal focal plane is convex or plano, said lens elements for a 10 mm. focal length eyepiece having parameters substantially as set forth in the following table wherein lens curvatures, lens thicknesses, and lens separations are given in millimeters, and N is the refractive index and V is the Abbe number of the glass used for a lens element:

| Lens | Radius | Thickness | Aperture | Glass | N | V |
|---|---|---|---|---|---|---|
| L1 | r1 = −24.25 | t1 = 1.89 | 9.33 | SF1 | 1.7174 | 29.5 |
| L2 | r2 = +44.45 | t2 = 9.25 | 13.33 | SK16 | 1.6204 | 60.3 |
|  | r3 = −19.99 |  |  |  |  |  |
|  | r4 = +130.93 | s1 = 0.16 |  |  |  |  |
| L3 | r5 = −69.51 | t3 = 5.43 | 20.00 | SK16 | 1.6204 | 60.3 |
|  | r6 = +48.50 | s2 = 0.16 |  |  |  |  |
| L4 | r7 = −146.71 | t4 = 8.15 | 20.00 | SK16 | 1.6204 | 60.3 |
|  | r8 = +88.33 | s3 = 0.16 |  |  |  |  |
| L5 | r9 = −32.88 | t5 = 11.28 | 20.00 | SK16 | 1.6204 | 60.3 |
| L6 | r10 = −103.48 | t6 = 2.35 | 20.00 | SF1 | 1.7174 | 29.5 |
|  | r11 = −20.64 | s4 = 39.83 |  |  |  |  |
| L7 | r12 = +17.52 | t7 = 1.59 | 9.33 | LAK8 | 1.7130 | 53.8 |
| L8 | r13 = +1144.93 | t8 = 4.25 | 9.33 | SF1 | 1.7174 | 29.5 |

4. An ultra wide-angle eyepiece having six lens elements in the positive power group arranged in a 2-1-2-1 format and two lens elements in the negative power group with the internal focal plane of the eyepiece lying between the two groups in which the lens surface of the positive group closest to the internal focal plane is convex or plano, said lens elements for a 10 mm. focal length eyepiece having parameters substantially as set forth in the following table wherein lens curvatures, lens thicknesses, and lens separations are given in millimeters, and N is the refractive index and V is the Abbe number of the glass used for a lens element:

| Lens | Radius | Thickness | Aperture | Glass | N | V |
|---|---|---|---|---|---|---|
| L1 | r1 = −10.23 | t1 = 0.79 | 4.75 | SF5 | 1.6727 | 32.2 |
| L2 | r2 = +14.02 | t2 = 5.94 | 7.53 | SK16 | 1.6204 | 60.3 |
|  | r3 = −10.23 | s1 = 0.28 |  |  |  |  |
| L3 | r4 = −46.05 | t3 = 2.77 | 9.51 | SK16 | 1.6204 | 60.3 |
|  | r5 = −17.62 | s2 = 0.28 |  |  |  |  |
| L4 | r6 = +59.09 | t4 = 7.13 | 10.89 | SK16 | 1.6204 | 60.3 |
|  | r7 = −14.02 |  |  |  |  |  |
| L5 | r8 = −46.05 | t5 = 1.19 | 10.89 | SF1 | 1.7174 | 29.5 |
|  | r9 = +22.31 | s3 = 0.28 |  |  |  |  |
| L6 | r10 = −59.09 | t6 = 5.94 | 12.28 | SK16 | 1.6204 | 60.3 |
|  | r11 = −7.61 | s4 = 19.03 |  |  |  |  |
| L7 | r12 = +56.61 | t7 = 1.98 | 5.15 | LAF2 | 1.7440 | 44.9 |
|  | r13 = −82.46 | s5 = 6.93 |  |  |  |  |
| L8 | r14 = −12.63 | t8 = 4.36 | 9.31 | FK5 | 1.4875 | 70.4 |

* * * * *